(12) United States Patent
Ebine et al.

(10) Patent No.: US 12,146,822 B2
(45) Date of Patent: Nov. 19, 2024

(54) PARTICLE QUANTITATIVE MEASUREMENT DEVICE

(71) Applicant: Hitachi High-Tech Corporation, Tokyo (JP)

(72) Inventors: Noriko Ebine, Tokyo (JP); Satoshi Takahashi, Tokyo (JP); Akira Masuya, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 431 days.

(21) Appl. No.: 17/627,858

(22) PCT Filed: Mar. 17, 2020

(86) PCT No.: PCT/JP2020/011637
§ 371 (c)(1),
(2) Date: Jan. 18, 2022

(87) PCT Pub. No.: WO2021/014682
PCT Pub. Date: Jan. 28, 2021

(65) Prior Publication Data
US 2022/0260479 A1 Aug. 18, 2022

(30) Foreign Application Priority Data
Jul. 19, 2019 (JP) ................. 2019-133320

(51) Int. Cl.
*G01N 15/14* (2024.01)
*G01N 15/01* (2024.01)
*G01N 15/1434* (2024.01)

(52) U.S. Cl.
CPC ............. *G01N 15/14* (2013.01); *G01N 15/01* (2024.01); *G01N 2015/1402* (2013.01); *G01N 2015/1443* (2013.01); *G01N 2015/1493* (2013.01)

(58) Field of Classification Search
CPC .... G01N 15/14; G01N 15/1433; G01N 15/06; G01N 15/1429; G01N 15/01;
(Continued)

(56) References Cited

U.S. PATENT DOCUMENTS 5,329,461 A 7/1994 Allen et al.
2002/0110928 A1 8/2002 Yahiro
(Continued)

FOREIGN PATENT DOCUMENTS

JP H7509314 A 10/1995
JP H11271220 A 10/1999
(Continued)

OTHER PUBLICATIONS

Search Report mailed Jun. 16, 2020 in International Application No. PCT/JP2020/011637.
(Continued)

*Primary Examiner* — Sang H Nguyen
(74) *Attorney, Agent, or Firm* — Miles & Stockbridge, P.C.

(57) ABSTRACT

Provided is a particle quantitative measurement device according to which the number of particles that can be accurately recognized in a particulate sample has a wider range. An observation device 1 comprises a computer 108 and an imaging camera 107 for acquiring a sample image representing the particulate sample. As an extraction unit, the computer 108 extracts a low-brightness pixel for which I<M−kσ is satisfied for brightness I from pixels of the sample image. Here, M represents brightness for a reference image, k represents a real positive number, and σ represents a standard deviation for the brightnesses of the pixels in the reference image. The computer 108 also functions as a particle recognition unit or a particle quantitative measure-
(Continued)

ment unit and quantitatively measures the particulate sample on the basis of the low-brightness pixel.

10 Claims, 12 Drawing Sheets

(58) Field of Classification Search
CPC ........... G01N 15/075; G01N 2015/144; G01N 2015/1486; G01N 2015/1493; G01N 2015/1443; G01N 2015/1402; G01N 2015/1006

See application file for complete search history.

(56) References Cited

U.S. PATENT DOCUMENTS

| | | |
|---|---|---|
| 2007/0273878 A1 | 11/2007 | Fujii et al. |
| 2009/0087075 A1 | 4/2009 | Kii et al. |
| 2013/0027540 A1* | 1/2013 | Ito .................... G01N 15/1433 348/79 |
| 2017/0085789 A1* | 3/2017 | Tatsuta ................ G02B 21/241 |
| 2017/0154420 A1 | 6/2017 | Barnes et al. |
| 2018/0210185 A1 | 7/2018 | Kato et al. |

FOREIGN PATENT DOCUMENTS

| | | |
|---|---|---|
| JP | 2002214228 A | 7/2002 |
| JP | 2007304044 A | 11/2007 |
| JP | 2007306889 A | 11/2007 |
| JP | 2015-166763 A | 9/2015 |
| JP | 2017529513 A | 10/2017 |
| JP | 2018-117557 A | 8/2018 |

OTHER PUBLICATIONS

Written Opinion mailed Jun. 16, 2020 in International Application No. PCT/JP2020/011637.

Office Action mailed Aug. 10, 2023 in Korean Application No. 10-2021-7042627.

\* cited by examiner

[FIG. 1]
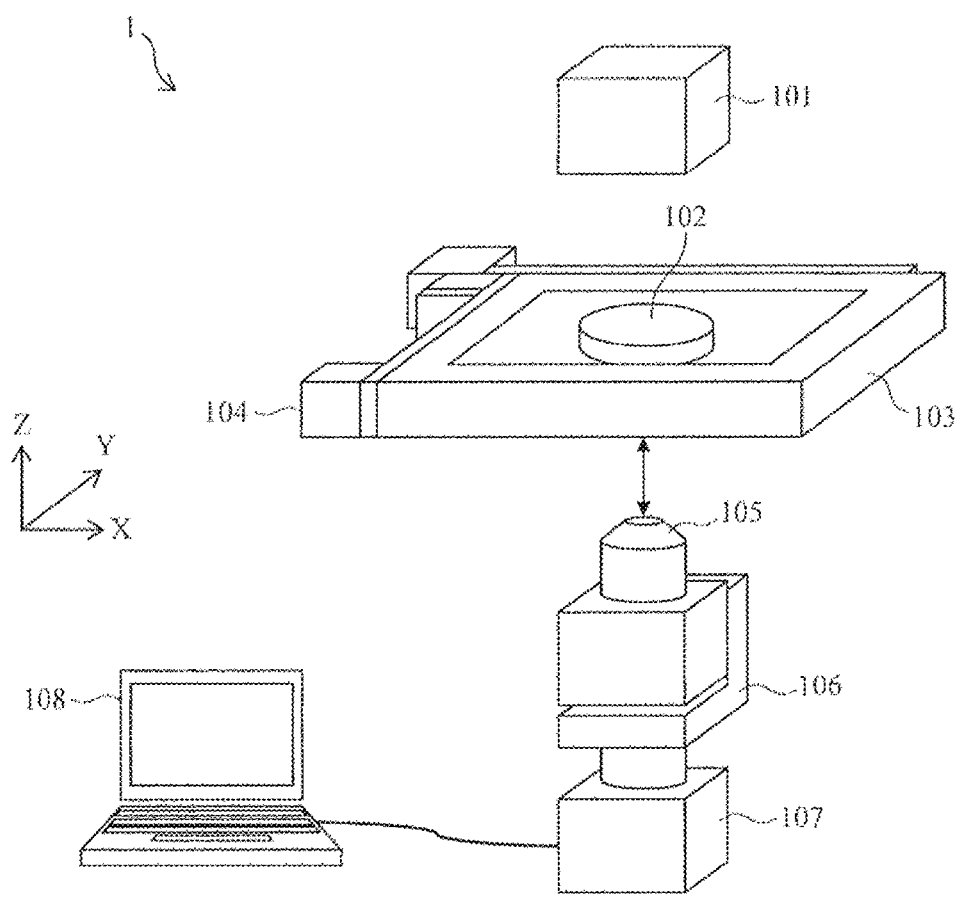

IMMEDIATELY AFTER START OF CULTURE (AFTER 119 MINUTES

AFTER 360 MINUTES

ENLARGED IMAGE

BRIGHTNESS PROFILE AT DIAGONAL LINE D

BRIGHTNESS PROFILE OF EACH OF REGIONS

[FIG. 4]
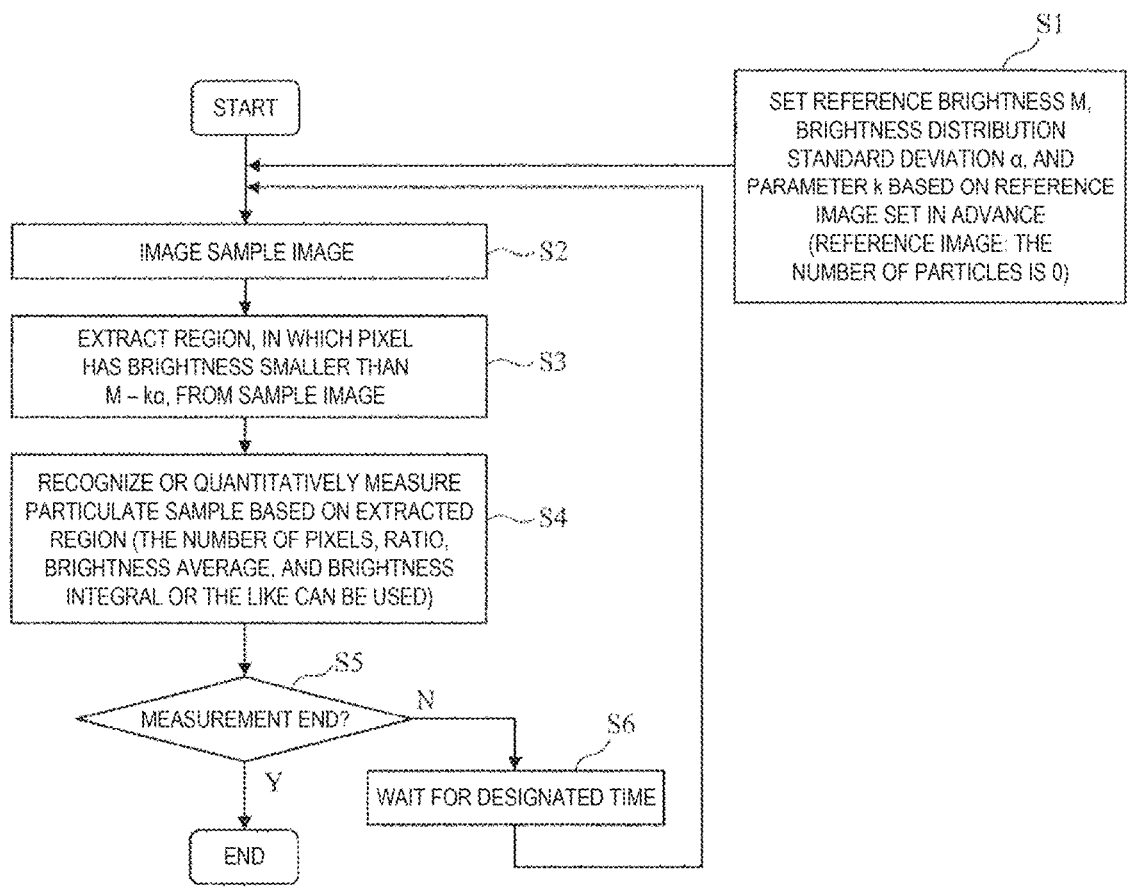

[FIG. 5]
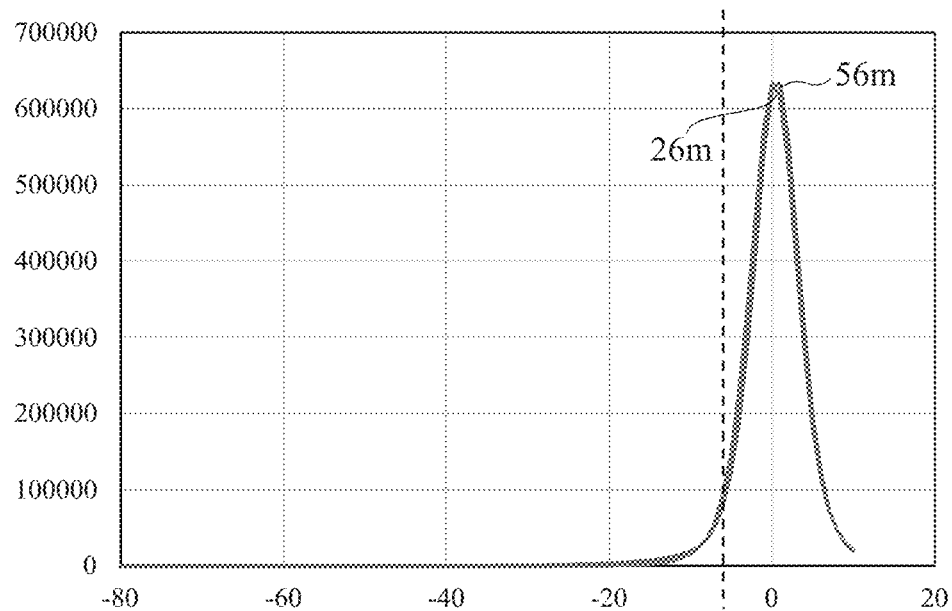
[FIG. 6]
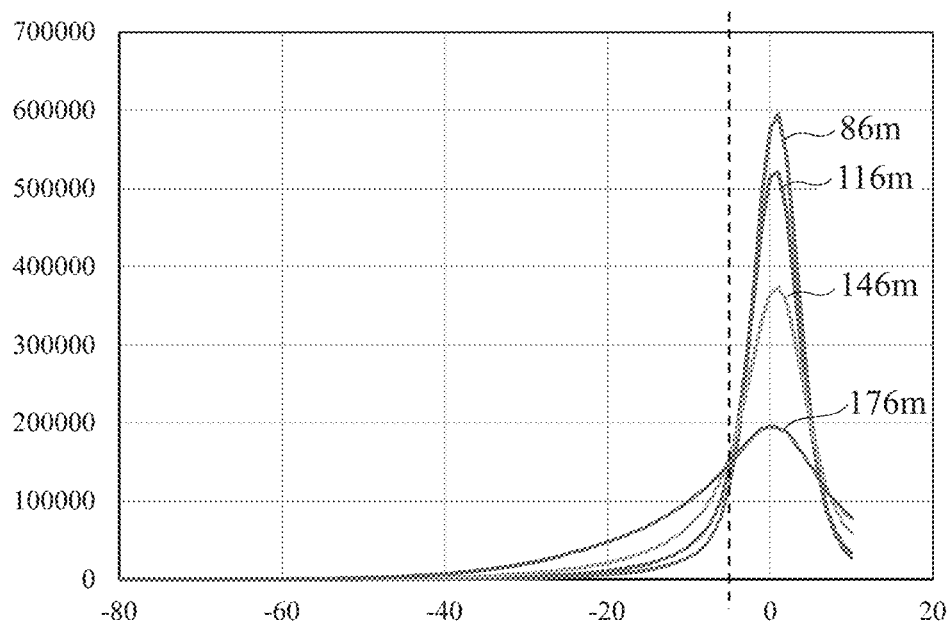

[FIG. 7]
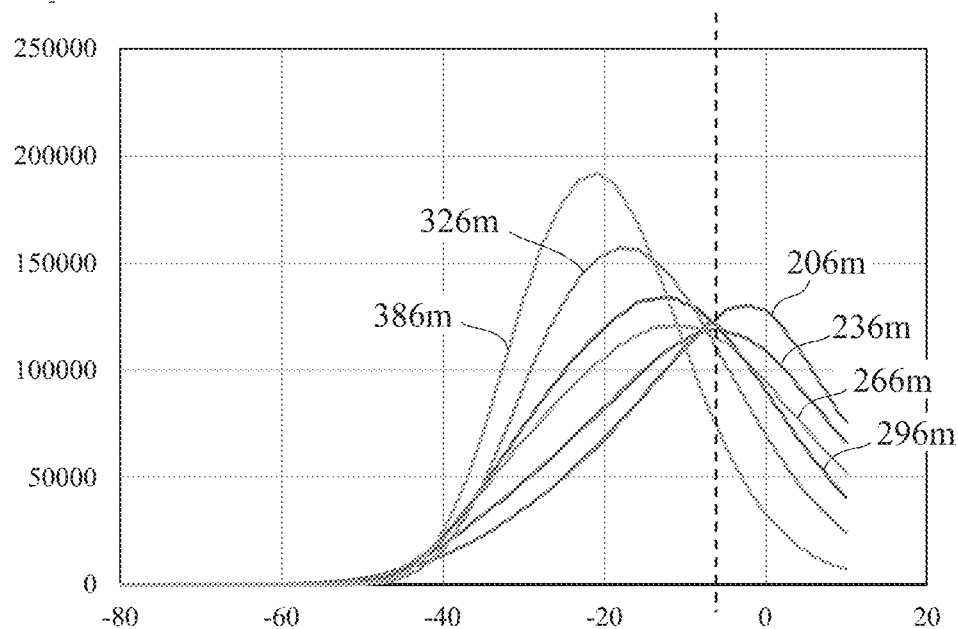
[FIG. 8]
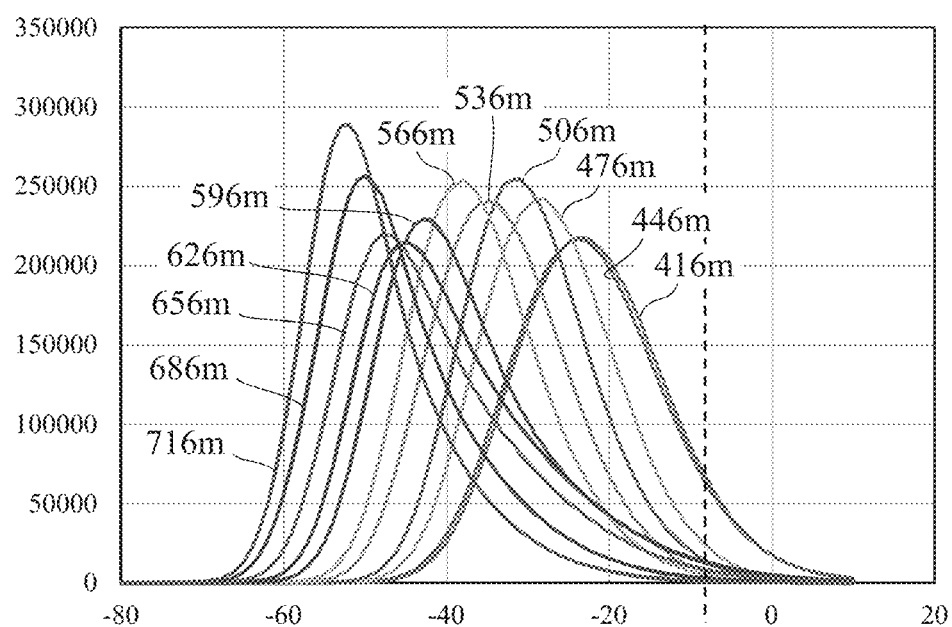

[FIG. 9]
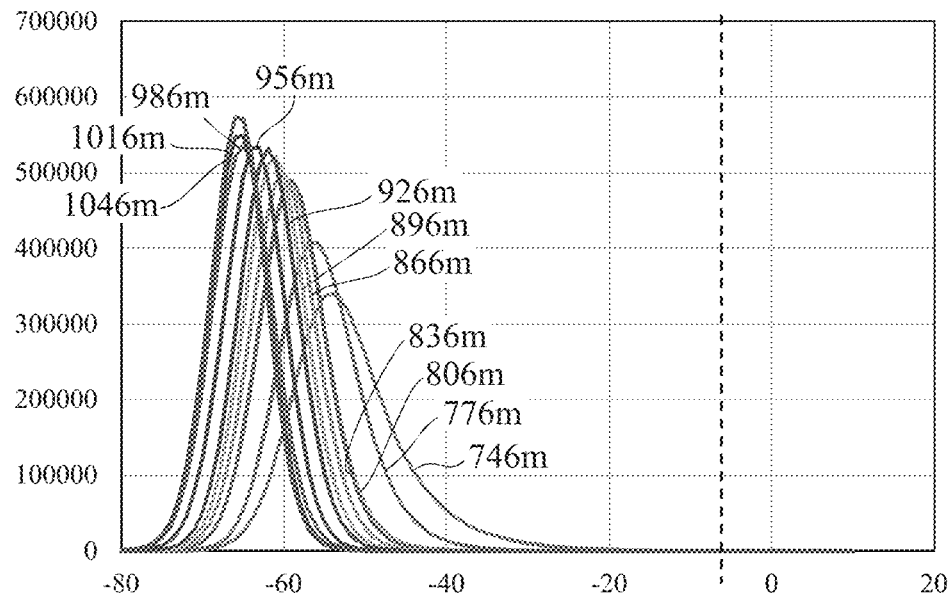
[FIG. 10]
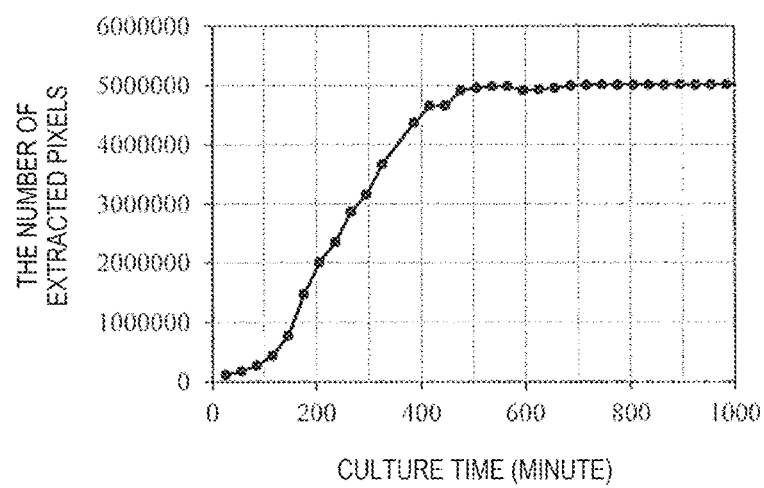

FIG. 11A
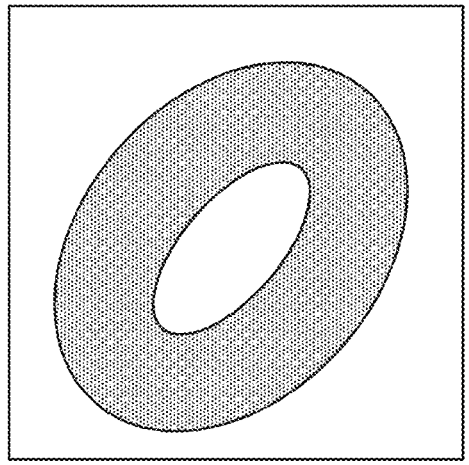
LOW-BRIGHTNESS REGION
FIG. 11B
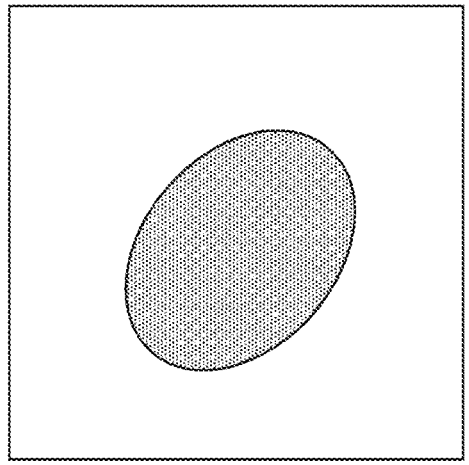
REGION DETECTED BY OTHER METHOD
LOGICAL SUM COMPUTATION
FIG. 11C
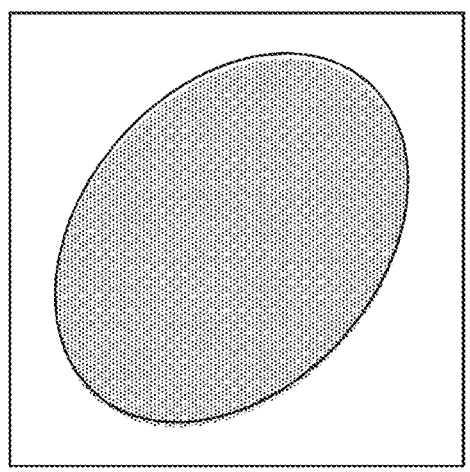
LOGICAL SUM REGION

[FIG. 12]
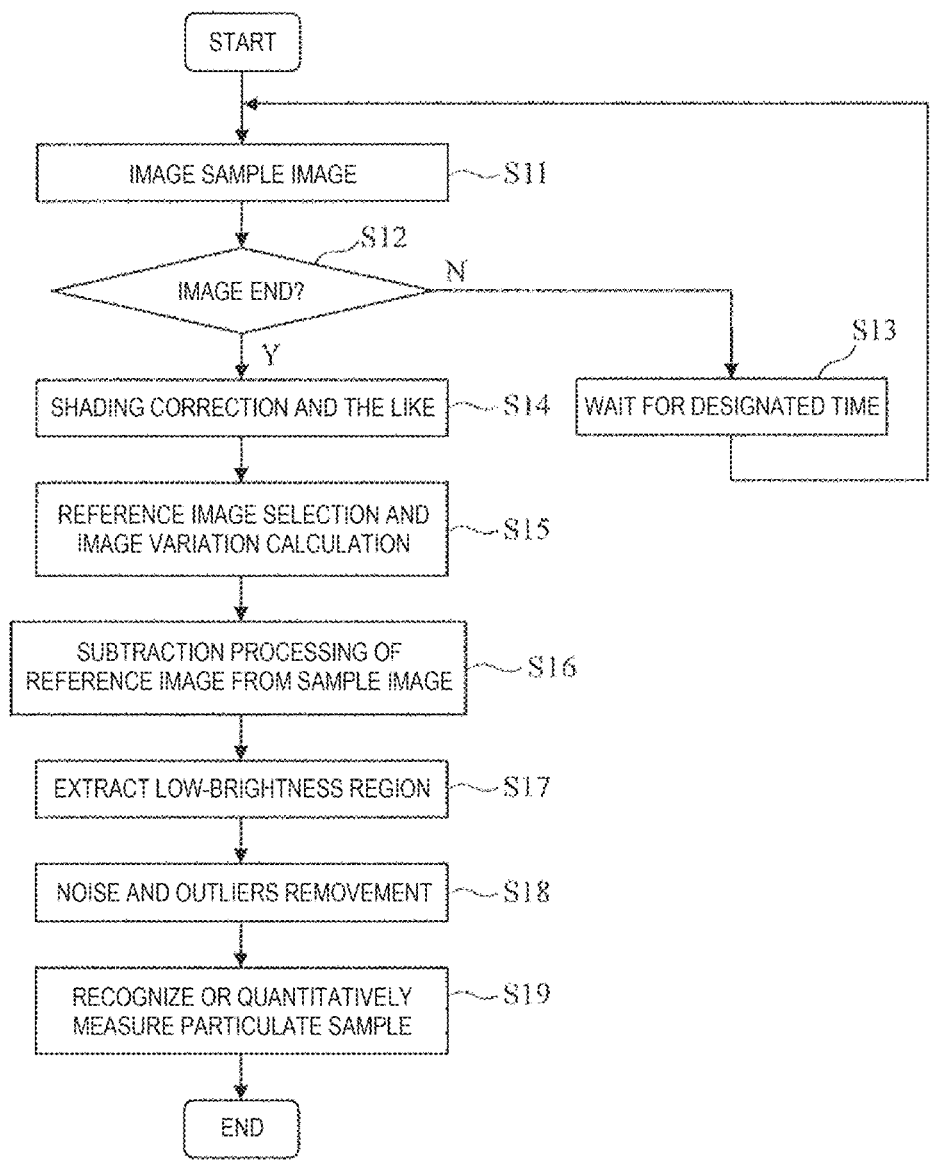

[FIG. 14]
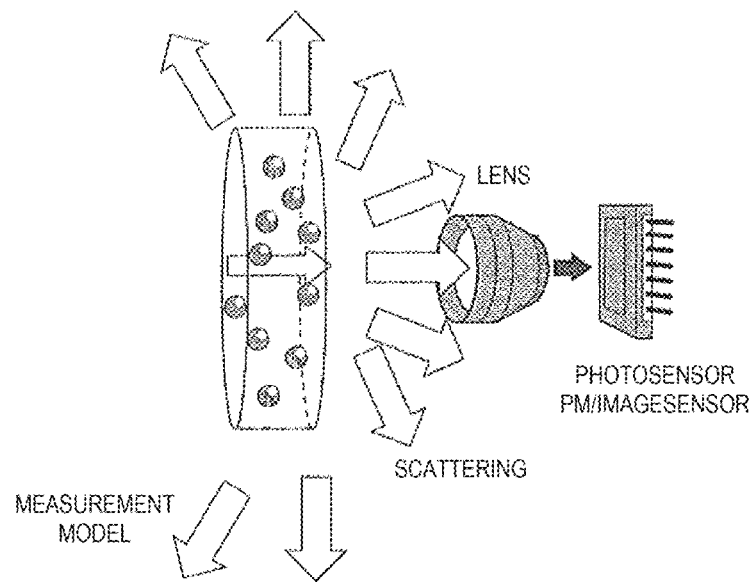
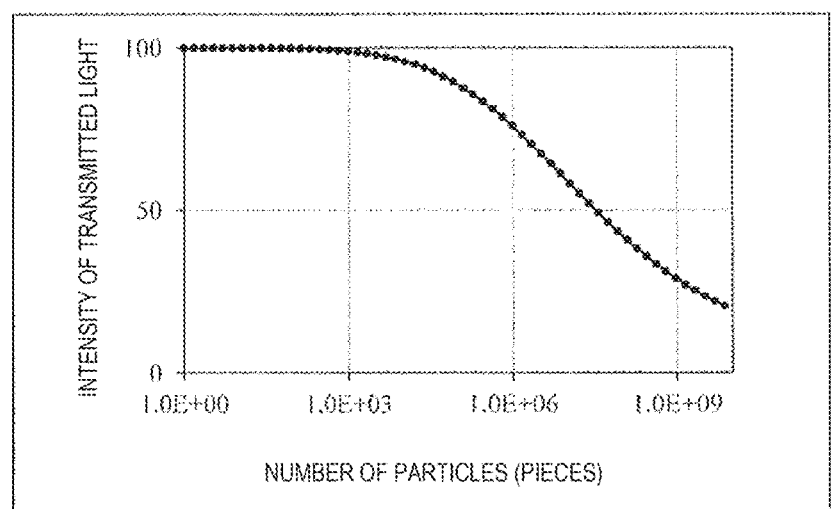

[FIG. 15]
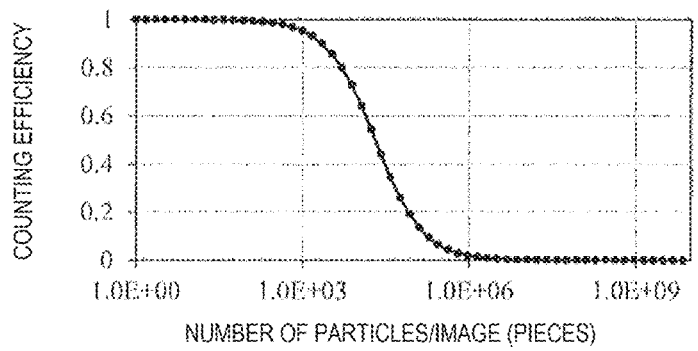
[FIG. 16]
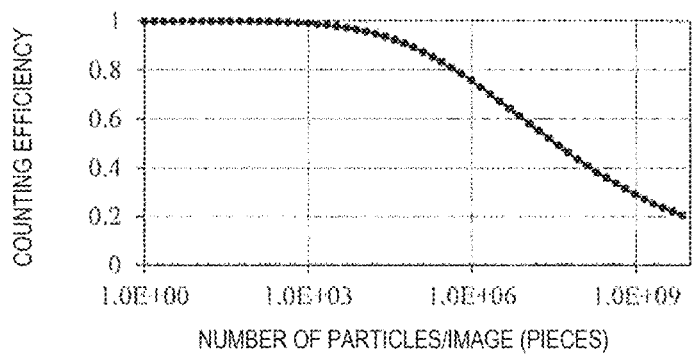
[FIG. 17]
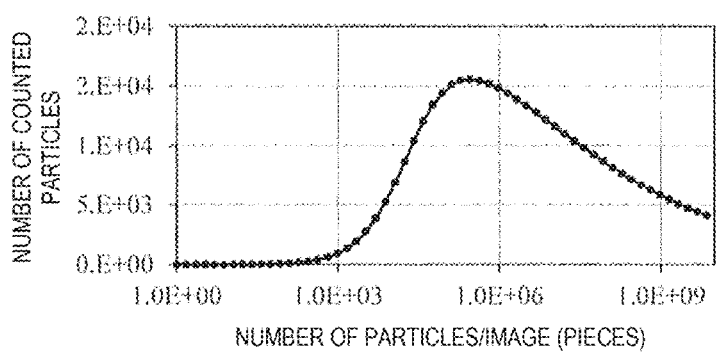

PARTICLE QUANTITATIVE MEASUREMENT DEVICE

TECHNICAL FIELD

The present invention relates to a particle quantitative measurement device.

BACKGROUND ART

In cell culture and bacterial culture in drug susceptibility testing and the like, a technique for measuring a state of cells, bacteria, and the like is required. As an example, a technique is known in which a culture state is detected from below a culture container by a camera or the like, and the number of cells and the number of bacteria are calculated based on a feature amount of the culture state.

As a method of measuring an amount of cells, the number of cells, and the like, there is a method in which transmission light of culture solution in the culture container or a transmission image of a culture surface is detected, and a concentration of a particulate article is calculated based on a change in intensity of the transmission light or transmission image. This is a method used in so-called turbidity measurement. As shown in FIG. 14, when the concentration of the particles increases, the intensity of the transmission light detected by a photodetector such as a photosensor or a camera decreases due to light scattering or/and diffraction or/and light absorption caused by the particles, so that the method is a method of calculating the number of particles based on the change in the intensity of the transmission light. An example of such a method is described in PTL 1.

Such a method has advantages that when the particles are present at a high concentration, the intensity is reduced at many locations due to light scattering and absorption caused by the particles, a sufficient change in intensity occurs as a whole, which facilitates the calculation of the number and concentration of the particles.

As another method, there is a method for identifying individual particles based on a feature amount of the particulate article and counting the particles individually. For example, there is a particle counting method in which the particles are detected by a camera or the like capable of sufficiently and finely measuring sizes of the particles, the particles are identified based on a contrast of a transmission image, and the particles are counted individually. An example of such a method is described in PTL 2.

The particle counting method has an advantage that, since the particles are identified and counted in units of one particle, even when the concentration is low or the number of particles is small, a change in the number of particles can be detected with high sensitivity and the particles can be detected with high sensitivity and high accuracy. Thus, for example, a slight change in the number of particles can be detected with high accuracy, and a sign of proliferation of cells during culture can be detected at an earlier stage.

CITATION LIST

Patent Literature

PTL 1: JP-A-2007-306889
PTL 2: JP-A-2002-214228

SUMMARY OF INVENTION

Technical Problem

However, in the related art, there is a problem that the number of particles which can be accurately recognized has a narrow range.

For example, in the method using the change in the intensity of the transmission light as in PTL 1, when the number of particles is small, an amount of light scattering and absorption caused by the particles is small with respect to the whole, and the change in transmission light intensity is small. Therefore, it is difficult to accurately calculate the number of particles and the concentration.

Meanwhile, for example in the particle counting method as in PTL 2, when the number of particles increases, contact between the particles and overlap between the particles stochastically increases, which makes it difficult to individually identify the particles. In normal, a distribution of the particles is represented by a Poisson distribution, and a simple count loss model is known (FIG. 15). That is, when an amount of particles present in a certain area increases, the efficiency of individually counting the particles decreases. Further, when the number of particles increases, more particles overlap in a light-transmission direction. As a result, the intensity of the transmission light decreases as a whole by multiply scattering the transmission light or the like, and the obtained image becomes unclear, so that the particle identification ability in image processing is reduced, and count loss further occurs (FIG. 16). For such a reason, in a case where the particles are counted, when the amount of particles present in a certain area increases, a particle count value apparently decreases (for example, FIG. 17), and it is difficult to accurately calculate the number of particles and the particle concentration. In particular, even though the number of particles increases, it is easy to cause erroneous recognition that the number of particles decreases. There is such a problem that is unavoidable in principle when particles are individually identified and counted.

The invention is made in view of such a situation, and an object of the invention is to provide a particle quantitative measurement device according to which the number of particles that can be accurately recognized in a particulate sample has a wider range.

Solution to Problem

An example of the particle quantitative measurement device according to the invention includes:
 an image acquisition unit configured to acquire a sample image representing a particulate sample; and
 a data processing unit configured to perform arithmetic processing on the sample image,
 in which the data processing unit includes:
  an extraction unit configured to extract a low-brightness pixel, for which $I<M-k\sigma$ is satisfied for brightness I, from pixels of the sample image, M represents brightness for a reference image, k represents a real positive number, and $\sigma$ represents a standard deviation for the brightness of pixels in the reference image, and
  a particle identification unit configured to recognize the particulate sample based on the extracted pixel.

The present description includes disclosure contents of Japanese Patent Application No. 2019-133320, which is the basis for the priority of the present application.

Advantageous Effect

According to the particle quantitative measurement device of the invention, the number of particles that can be accurately recognized in the particulate sample has a wider range.

BRIEF DESCRIPTION OF DRAWINGS

FIG. 1 is a schematic configuration diagram of an observation device according to a first embodiment.

FIG. 4 is a flowchart showing a processing process according to the first embodiment.

FIG. 5 is a diagram showing an example of a calibration curve related to quantitative measurement of the particulate sample.

FIG. 6 is a diagram showing an example of the calibration curve related to the quantitative measurement of the particulate sample.

FIG. 7 is a diagram showing an example of the calibration curve related to the quantitative measurement of the particulate sample.

FIG. 8 is a diagram showing an example of the calibration curve related to the quantitative measurement of the particulate sample.

FIG. 9 is a diagram showing an example of the calibration curve related to the quantitative measurement of the particulate sample.

FIG. 10 is a graph showing a change in the number of pixels in a low-brightness region according to the first embodiment.

FIGS. 11A-11C are diagrams showing an example of logical sum calculation performed by an observation device according to a second embodiment.

FIG. 12 is a flowchart showing a processing process according to a third embodiment.

FIG. 14 is a diagram showing a method for detecting a particulate sample based on an intensity of transmission light according to a technique in the related art.

FIG. 15 is a simulation diagram showing a change in counting efficiency with respect to a particle amount by a count loss model when particles are identified based on an image and the number of particles is counted according to a technique in the related art.

FIG. 16 is a simulation diagram showing an influence on count loss caused by a decrease in light transmission intensity due to scattering, diffraction, or the like according to a technique in the related art, and the decrease in light transmission intensity is caused by overlap of particles.

FIG. 17 is a simulation diagram showing a relation between the actual number of particles and the number of particles that is counted by identification in a case where the count loss occurs according to a technique in the related art.

DESCRIPTION OF EMBODIMENTS

Figure 2A:
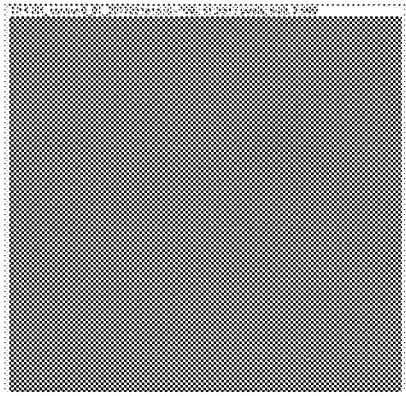
FIGS. 2A-2C are examples of a change over time in images when a particulate sample is cultured in a constant temperature state.

Embodiments of the invention will be described below with reference to accompanying drawings. Although the drawings show specific embodiments in accordance with the principles of the invention, the drawings are shown for the purpose of understanding the invention, and are not to be used for limiting interpretation of the invention.

First Embodiment (1) Outline of Configuration of Device

A device according to a first embodiment will be described with reference to FIG. 1. FIG. 1 is a schematic configuration diagram showing a configuration of an observation device 1 according to the first embodiment. The observation device 1 is a device for observing a particulate sample. The particulate sample means, for example, a sample including particles, cells, or bacteria. The meaning of the "particles" is not particularly limited, and may be defined as, for example, particles including organisms such as cells and bacteria, and may be non-organisms such as latex particles and polystyrene beads.

As shown in FIG. 1, the observation device 1 includes, as main components, an illumination optical system 101, a sample container 102, a pedestal 103, an XY stage 104, an objective lens 105, an objective lens actuator 106, an imaging camera 107, and a computer 108.

The illumination optical system 101 uniformly illuminates the particulate sample. For example, when the particulate sample is placed on a bottom surface of the sample container 102, the bottom surface of the sample container 102 is uniformly illuminated. The illumination optical system 101 is constituted by an optical system such as Kohler illumination.

The sample container 102 includes a storage portion capable of holding the particulate sample. The particulate sample can be provided as, for example, one or more sample liquids. As the sample container 102, for example, a petri dish, a dish, or a microliter plate is used. The sample container 102 holds a biological particulate sample such as cells or bacteria inside the sample container 102 or in a well. The sample container 102 can be used for operations such as cell culture and bacteria culture, and in particular, can be used for identification culture and culture for drug sensitivity testing.

The pedestal 103 can hold the sample container 102. The pedestal 103 preferably has a structure in which an upper surface and a lower surface of a measurement sample surface (that is, upstream or downstream in an optical path) in the sample container 102 transmit light. As a structure that transmits light, a transparent member may be used, and a void having no shielding structure or the like may be used.

The XY stage 104 can move, in an X direction and a Y direction, the pedestal 103 on which the sample container 102 is placed. The XY stage 104 may include a heater or the like (not shown) that adjusts a temperature of the sample container 102. As the heater, for example, a transparent glass heater can be placed on a bottom surface or a periphery of the XY stage 104. In addition, the entire optical system may be surrounded by a heat-insulating material, and an internal temperature may be adjusted by the heater.

The objective lens 105 is held on the objective lens actuator 106. The objective lens actuator 106 is an actuator that moves the objective lens 105 in a Z direction (an illumination optical axis direction), and can move a focal position of the objective lens 105 in a depth direction of the sample container 102. The imaging camera 107 can be focused on the measurement sample surface of the sample container 102 by an operation of the objective lens 105.

The imaging camera 107 functions as an image acquisition unit that acquires an image (a sample image) representing the particulate sample. Such a configuration is suitable for a case where the particles have translucency. In the present embodiment, the sample image is a transmission image, that is, an image formed by light transmitted through the particulate sample. The imaging camera 107 is provided at a focal position of the objective lens 105, that is, at a position where an image of the particulate sample is formed. If the objective lens 105 is compatible with an infinity correction optical system, an image forming lens is provided between the imaging camera 107 and the objective lens 105. The imaging camera 107 images, for example, the sample image as a microscope image. The imaging camera 107 has a function of converting the imaged sample image into an electric signal and outputting or transmitting the electric signal. In the present embodiment, the imaged sample image is transmitted to the computer 108.

An optical filter (not shown), such as a color glass filter or an interference filter, may be appropriately inserted between the imaging camera 107 and the objective lens 105 as necessary.

The computer 108 can be configured using a known computer, and includes a arithmetic processing unit that performs various kinds of arithmetic processing and controls, and a storage unit that stores information. The storage unit may include a temporary, volatile, or a transient storage medium such as a semiconductor memory device, may include a non-transitory, non-volatile, or non-transient storage medium such as a hard disk, or may include both of the storage mediums. In addition, the computer 108 may include an input device (a mouse, a keyboard, or the like) that receives an input from a user and a display device (a display or the like) that displays a measurement result. In the present embodiment, the computer 108 functions as a data processing unit that performs arithmetic processing related to the sample image, and executes a data processing step for performing the arithmetic processing related to the sample image.

In the present embodiment, cells or bacteria, which are biological particulate samples, are used as a target to be observed by the observation device 1. The cells or bacteria are cultured in a 96-well microliter plate, and changes over time are measured.

(2) Features of Sample Image

Figure 2B:
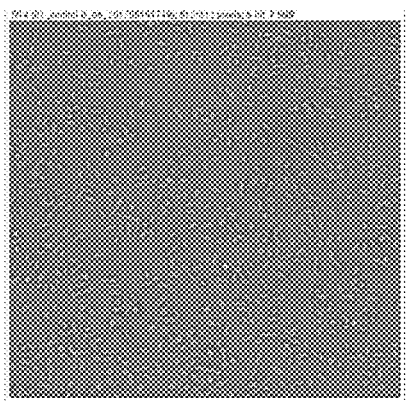
Figure 2C:
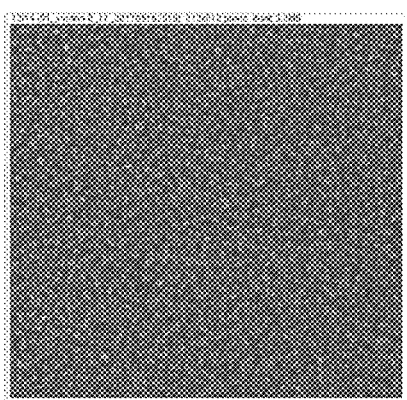

FIGS. 2A-2C show examples of the changes over time in an image (a transmission light image) when the particulate sample is cultured at a constant temperature state. FIG. 2A is an image immediately after start of the observation, FIG. 2B is an image after about 2 hours from the start of the observation, and FIG. 2C is an image after 6 hours from the start of the observation. FIGS. 2A-2C shows a state in which the particulate sample grows with culture time. After about 2 hours (FIG. 2B), the particulate sample can be individually identified, but after 6 hours (FIG. 2C), the particles are close to each other or overlap with each other, and a contour of each particle becomes unclear. In addition, brightness decreases as a whole, and it is difficult to identify each particle. As a result, in the particle counting method as in PTL 2, it is difficult to identify the particles, which makes it difficult to accurately count the particles.

Figure 3A:
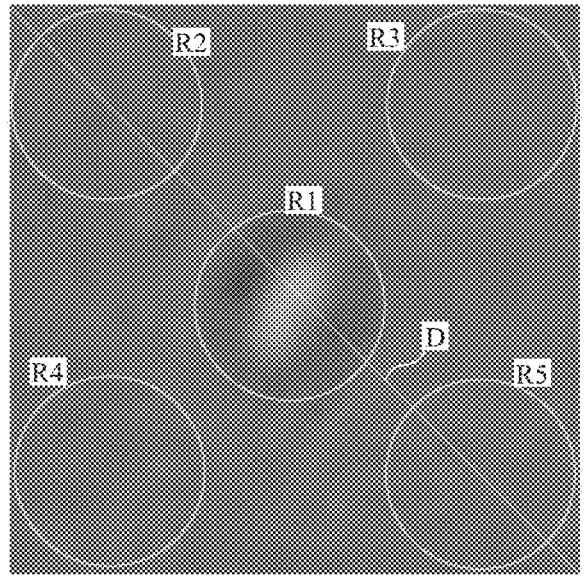
FIGS. 3A-3C show an enlarged image of one particle and property analysis diagrams of the image.
Figure 3B:
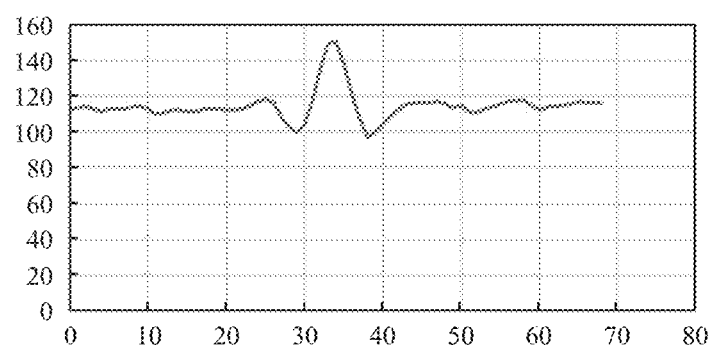
Figure 3C:
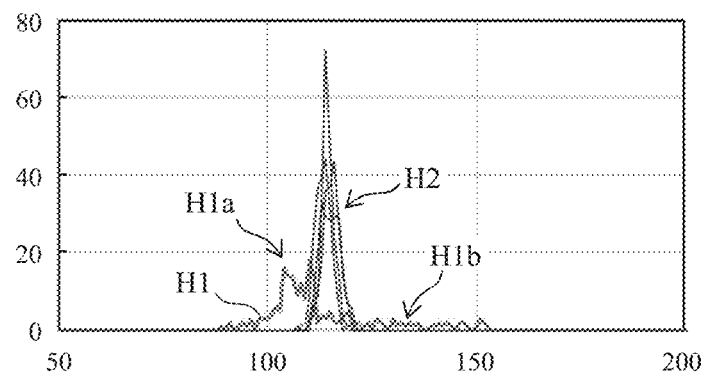

FIGS. 3A-3C show enlarged images of one particle in the particulate sample and property analysis diagrams of the image. FIG. 3A is the enlarged image in which one particle is placed in the vicinity of the center, and includes a region R1 where the particle is present, an upper left region R2, an upper right region R3, a lower left region R4, and a lower right region R5.

FIG. 3B is a brightness profile at a diagonal line D extending from the upper left to the lower right in FIG. 3A. A horizontal axis represents a distance from an upper left vertex, and a vertical axis represents brightness of pixels. An increase in brightness corresponding to the particle in the vicinity of the center of the image is observed, and a decrease in brightness corresponding to a periphery (edge) of the particle is observed at both ends of the brightness increase portion.

FIG. 3C is a histogram showing the brightness profile of each of the regions R1 to R5. A horizontal axis represents the brightness, and a vertical axis represents the number of pixels having the brightness. In this histogram, the brightness of each pixel is represented by 256 levels of 0 to 255, 0 is the lowest brightness (dark) and 255 is the highest brightness (bright). Only a histogram H1 of the region R1 is indicated by a thick line, and histograms of the regions R2 to R5 are indicated by thin lines. In FIG. 3C, the histograms of the regions R2 to R5 are not particularly and individually specified (the histograms are not essential in the description of the present embodiment).

Due to the presence of the particle, the brightness in the vicinity of the center of the particle is high and the brightness of the peripheral portion of the particle is low due to a diffraction phenomenon of light or the like. Therefore, the histogram H1 of the region R1 is wider than histograms H2 of the regions R2 to R5. That is, the histogram H1 of the region R1 has a portion H1$a$ formed of low-brightness pixels having brightness of about 80 to 110 and a portion H1$b$ formed of high-brightness pixels having brightness of about 125 to 150.

(3) Outline of Function of Device

As described above, a feature occurs that the center portion of the particle has high brightness, and the periphery of the particle has low brightness when the particle is present. By using the feature, particles can be identified using a known method. In the particle counting method in related art, such a method is used.

However, the inventors have found that the presence of particles can be simply confirmed by extracting a portion having lower brightness as compared with a portion where no particle is present. An example of an operation of the observation device 1 based on the principle will be described below.

FIG. 4 is a flowchart showing an example of an operation of the observation device 1, and includes a data processing process to be performed on the sample image. The flowchart represents a method according to the first embodiment. First, in the observation device 1, predetermined variables are set based on a reference image (step S1). For example, as the reference image, an image including a portion where no particle is present is prepared.

As the reference image, any image can be used, for example, an image of a region, in a sample image, where no particle is present may be used, a sample image in a case where the number of particles is 0 may be used, or a sample image in a case where the number of particles can be regarded as 0 may be used. When such a reference image is used, a reference suitable for the sample image can be set. In addition, alternatively, another image that is freely created may be used. The reference image may be corrected in advance for sensitivity unevenness or the like.

In addition, as the reference image, a fixed reference image may be used for different sample images, or an appropriate reference image may be selected or imaged for each sample image. In particular, a different reference image may be imaged every time for each particulate sample.

The observation device 1 sets brightness of the reference image as reference brightness M. Any method for defining the reference brightness M based on the reference image can be used, and for example, the reference brightness M can be defined for each pixel of the reference image. As a more specific example, brightness of a pixel at a certain position in the reference image may be set as the reference brightness M when a pixel at the same position in the sample image is evaluated. In addition, only one reference brightness M can be defined for the entire reference image, and for example, an average value of brightness of all pixels in the reference image is set as the reference brightness M, and the reference brightness M may be compared with the brightness of each pixel in the sample image.

The observation device 1 calculates a standard deviation of the brightness of pixels in the reference image. Further, the observation device 1 acquires a threshold parameter k to be described later. The value of k may be stored in advance by the observation device 1 or may be input via any input device.

Next, the observation device 1 images a sample by the imaging camera 107 and acquires an imaged sample image (step S2, an acquisition step). Here, image correction of various known types may be performed on the sample image.

Then, in the sample image, a portion having low brightness as compared with the reference brightness M is extracted (step S3, an extraction step). In the present embodiment, the brightness is not directly compared with the reference brightness M, but is compared with a threshold brightness Th calculated according to the reference brightness M. The threshold brightness Th is determined to be a value smaller than the reference brightness M.

In the present embodiment, the threshold brightness Th is calculated by using the reference brightness M and the standard deviation σ of the brightness of the pixels in the reference image. For example, the threshold brightness Th is calculated as Th=M−kσ. Here, k is the threshold parameter described above and is a real positive number. A value of k is, for example, within a range of 1≤k≤3, and for example, k=2. Then, the observation device 1 extracts a pixel for which I<Th=M−kσ is satisfied for brightness of I of the pixel from pixels of the sample image as a low brightness pixel.

When particles (for example, cells) grow and are concentrated such that the particles overlap with each other as in FIG. 2C, a region where the particles are not present is substantially not found, and the intensity of the entire pixels decreases. Therefore, the contrast also decreases, and it is difficult to identify the particles by the particle counting method in related art.

Thus, in the present embodiment, the particles are quantitatively measured using a calibration curve as follows. As a result, even when the particles are concentrated and the particles overlap with each other, the count loss as described in relation to FIG. 17 is prevented, and the processing is performed such that the amount of the particulate sample to be calculated increases as the actual amount of the particulate sample increases.

FIGS. 5 to 9 are histograms in which brightness distribution of all pixels of a certain particulate sample are displayed side by side at each time from the transmission image obtained at each culture time. The horizontal axis represents the brightness, and the vertical axis represents the number of pixels. In FIGS. 5 to 9, a position where the threshold brightness is Th=M−kσ when k=2 is indicated by a broken line.

"m" in the figures represents a unit of time, and represents "minute" in this example. For example, FIG. 5 shows a brightness distribution of an image in a case where the culture time is 26 minutes (that is, an image imaged at a time point when 26 minutes have elapsed from the start of culture) and a brightness distribution of an image in a case where the culture time is 56 minutes (that is, an image imaged at a time point when 56 minutes have elapsed from the start of culture).

An image at the start of culture was used as a reference image, and a brightness distribution of each image obtained by subtracting the reference image from the image at each time (that is, a distribution of values obtained by subtracting the reference brightness from the brightness of the pixels) was displayed. Therefore, the brightness values are distributed in both positive and negative directions. The subtraction was performed in units of pixels. The similar processing can be performed without subtracting the reference image, and in this case, a value of the horizontal axis in the figures changes.

It can be seen from FIG. 6 that, when the culture time is 176 minutes or less, a peak is found in the vicinity of brightness 0 and the particles grow without substantially overlapping with each other. When the culture time exceeds 200 minutes, a peak position is shifted in a negative direction as shown in FIG. 7. That is, due to overlap of the particles or the like, a transmission intensity of the pixel at a position where the particle is present decreases. Further, as time elapses, the brightness of the transmission image decreases. In such a state, the particles cannot be accurately counted even when a particle identification method in related art such as the particle counting method is used, and as a result, the count loss increases, and the number of particles reduces.

Thus, in the present embodiment, as described in step S3, by performing processing of extracting the region having low brightness as compared with the reference brightness M, and setting the region as a particle present region, the influence of the count loss described above is reduced.

The computer 108 recognizes or quantitatively measures the particulate sample based on the region formed of the extracted low-brightness pixel (low-brightness region) (step S4, a recognition step or quantitative measurement step). That is, the computer 108 functions as an extraction unit that extracts a low-brightness pixel, and functions as a particle recognition unit or a particle identification unit that recognizes the particulate sample. As a result, the observation device 1 recognizes the particulate sample based on the extracted low-brightness pixel. As a more specific example, it can be determined that the particulate sample is present in the low-brightness region. In this way, the observation device 1 functions as a particle recognition device.

In addition, the observation device 1 can quantitatively measure the particulate sample based on the extracted low-brightness pixel. That is, the computer 108 functions as a particle quantitative measurement unit that recognizes and quantitatively measures the particulate sample. Here, the "quantitative measurement" includes, in addition to accurately measuring of the number of particles, and calculating of the approximate number of particles, calculating the concentration of particles, and the like. In this way, the observation device 1 functions as a particle quantitative measurement device.

When the quantitative measurement is performed, a specific method can be optionally designed, and for example, it is possible to calculate the number of low-brightness pixels and quantitatively measure the particulate sample based on this number. Further, for example, it is possible to calculate a ratio of the number of low-brightness pixels to a total number of pixels of the sample image and quantitatively measure the particulate sample based on the ratio.

The observation device 1 can calculate the number of particles, the concentration, and the like using the calibration curve or the like obtained in advance. For example, the computer 108 may function as a calibration curve acquisition unit that acquires a calibration curve which associates a value related to the low-brightness pixel with the amount of the particulate sample. The "value related to the low-brightness pixel" can be the number of low-brightness pixels, the ratio of the low-brightness pixels in the sample image, or the like. Such a calibration curve may be stored by the computer 108 in advance.

In addition, for example, the observation device 1 (or the particle quantitative measurement unit described above) may quantitatively measure the particulate sample based on the calibration curve and the value related to the low-brightness pixel in the sample image. As a more specific example, it is possible to use a function that gives the amount of the particulate sample in accordance with the number of the low-brightness pixels or a function that gives the amount of the particulate sample in accordance with the ratio of the low-brightness pixels.

As a more specific example, the relation between the culture time and the amount of the particulate sample (for example, the number of cells) is obtained by a separate experiment or the like, and the relation between the culture time and the number of low-brightness pixels is obtained based on information shown in FIGS. 5 to 9. Based on these two types of relations, it is possible to create the calibration curve that associates the number of the low-brightness pixels with the amount of the particulate sample. As described above, based on the calibration curve and the number of low-brightness pixels in a desired sample image, it is possible to determine the amount of the particulate sample in the sample image.

Next, the observation device 1 determines whether or not to end the measurement (step S5). For example, it is determined whether or not a measurement time designated in advance has elapsed, or it is determined to end the acquisition of the sample image when a predetermined end operation is received from a user of the observation device.

When the measurement is not ended, the observation device waits for a predetermined time designated in advance (step S6), and the processing returns to step S2. In this case, the acquisition of the sample image is repeated after the predetermined time. In this way, the observation device according to the present embodiment can acquire sample images at predetermined time intervals and acquire time-lapse information. For example, the imaging camera 107 acquires sample images at the predetermined time intervals. In this way, change over time in the amount of the particulate sample can be monitored.

As described above, for example, when the number of particles is small, the particles are present substantially without overlapping with each other. The low-brightness region per particle is substantially the same for each particle, and the low-brightness region in the entire image increases substantially in proportion to the increase in the number of particles, so that it is possible to perform the quantitative measurement more accurately than the method in related art using the change in the intensity of the transmission light as in PTL 1. On the other hand, when the number of particles is large, overlap of the particles occurs, the brightness distribution of the region corresponding to the particle image is shifted to a smaller side, the entire region becomes dark, and the ratio of the low-brightness region in the particle present region increases. Therefore, as the number of particles increases and more particles overlap with each other, the number of pixels determined to have low brightness in the particle present region increases, so that it is possible to perform the quantitative measurement more accurately than the method in related art using the particle counting method as in PTL 2.

FIG. 10 is a graph showing a change, with respect to the culture time, in the number of pixels in a low-brightness region (the particle present region) in the examples shown in FIGS. 5 to 9. When the culture time is short, as described with reference to FIGS. 3A, 3B and 5 to 9, pixels whose brightness I is less than the threshold brightness Th are extracted, and the change in the number of particles can be detected with high sensitivity.

Further, even in the case where the culture time is long and the particles are concentrated or overlap with each other, the calculation result of the number of particles shows a substantially monotonic increase. When the culture time is longer than 500 minutes, the particles are present over the entire image, the number of low-brightness pixels is saturated, but unlike that shown in FIG. 17, the number of low-brightness pixels does not decrease. Therefore, even if the number of particles increases beyond a measurement limit, an erroneous measurement value is not obtained.

In this way, according to the particle recognition device, the particle quantitative measurement device, a particle recognition method, the particle quantitative measurement method related to the observation device 1 of the present embodiment, accurate quantitative measurement can be performed in a wide range obtained by combining countable ranges of the two methods in related art, so that the range of the number of particles within which the particles in the particulate sample can be accurately recognized becomes wider.

The observation device 1 can be applied to culture monitoring of cells or bacteria, identification of cells or bacteria, drug susceptibility testing of cells or bacteria, and the like, and can perform accurate measurement or testing over a wide range of the number of particles.

For example, the sensitivity is high when the amount of the particulate sample is small, a minute change in the number of particles can be accurately detected, and even when the amount of the particulate sample is large and the particulate samples overlap with each other, the change in the number of particles can be detected without count loss.

The observation device 1 according to the present embodiment is not limited to the application of the culture monitoring or testing of cells or bacteria, and is also applicable to, for example, measurement of aggregates in an immunoreaction measurement using an aggregation reaction of fine particles. It is also possible to reduce a phenomenon such as a prozone.

According to the observation device 1, a region extraction processing can be easily performed just by setting the threshold parameter k, and the cost can be reduced. The processing speed can also be increased.

Second Embodiment

In a second embodiment, a logical sum of the low-brightness region according to the first embodiment and a region extracted by another method is obtained.

FIGS. 11A-11C show examples of logical sum calculation performed by an observation device according to the second embodiment. A colored portion in FIG. 11A represents a low-brightness region determined by the observation device 1 according to the first embodiment. FIGS. 11A-11C roughly correspond to FIGS. 3A-3C, and a peripheral portion of a particle is extracted as a low-brightness region, but a central portion of the particle is not a low-brightness region since the brightness is high.

On the other hand, a colored portion in FIG. 11B represents a particle present region detected using a method other than that of the first embodiment. For example, in an observation device according to a modification, the computer 108 functions as an individual identification unit that extracts an individual identification region from a sample image by individually identifying particles based on the sample image. Any method for individually identifying the particles may be used, and for example, a known contrast method may be used, or other methods may be used.

A colored portion in FIG. 11C represents a logical sum region obtained by a logical sum of the low-brightness region formed of low-brightness pixels shown in FIG. 11A and the individual identification region shown in FIG. 11B. The observation device (or the particle quantitative measurement unit described above) according to the modification quantitatively measures the particulate sample based on the logical sum region shown in FIG. 11C.

For example, the observation device (or the particle quantitative measurement unit described above) according to the second embodiment can quantitatively measure the particulate sample based on:
- an average value of brightness of pixels in the logical sum region, or
- an integration value of brightness of pixels in the logical sum region,
- a total number of pixels in the logical sum region, or
- other parameters related to the logical sum region.

When the quantitative measurement is performed based on the number of the pixels in the logical sum region, for example, it is possible to calculate a ratio of the number of pixels in the logical sum region to the total number of pixels of the sample image and quantitatively measure the particulate sample based on the ratio.

The observation device according to the second embodiment can calculate the number of particles, the concentration, and the like using the calibration curve or the like obtained in advance. For example, the computer 108 may function as a calibration curve acquisition unit that acquires a calibration curve which associates a value related to the pixel in the logical sum region with the amount of the particulate sample. As described above, the "value related to the pixel in the logical sum region" can be the average value of the brightness of the pixels in the logical sum region, the integration value of the brightness of the pixels in the logical sum region, the total number of pixels in the logical sum region, and the like.

In addition, for example, the observation device according to the second embodiment may quantitatively measure the particulate sample based on the calibration curve and the value related to the pixel in the logical sum region in the sample image. As a more specific example, it is possible to use a function that gives the amount of the particulate sample in accordance with the number of the pixels in the logical sum region or a function that gives the amount of the particulate sample in accordance with the ratio of the pixels in the logical sum region.

In this way, according to a particle recognition device, a particle quantitative measurement device, a particle recognition method, and a particle quantitative measurement method related to the observation device of the second embodiment, a particle present region can be extracted using a known method in addition to the method in the first embodiment, so that there is a possibility that more accurate recognition or quantitative measurement can be performed depending on properties of the particulate sample. In particular, when the number of particles is small, the number of pixels extracted in the logical sum region for each particle increases, so that there is a possibility that a change in the number of particles when the number of particles is small can be detected with higher sensitivity.

Third Embodiment

The third embodiment is obtained by adding processing related to noise and outlier removal for a sample image to the first embodiment or the second embodiment.

FIG. 12 is a flowchart showing an example of an operation of an observation device according to the third embodiment, and includes a data processing process for the sample image. The flowchart represents a method according to the third embodiment. In the processing in FIG. 12, first, the observation device acquires a sample image (step S11). The processing can be, for example, the same as that of step S2 in FIG. 4.

Next, the observation device determines whether or not to end the acquisition of the sample image (step S12). For example, it is determined whether or not a measurement time designated in advance has elapsed, or it is determined to end the acquisition of the sample image when a predetermined end operation is received from a user of the observation device.

When the acquisition of the sample image is not ended, the observation device waits for a predetermined time designated in advance (step S13), and the processing returns to step S11. In this case, the acquisition of the sample image is repeated after the predetermined time. In this way, the observation device according to the third embodiment can acquire sample images at predetermined time intervals and acquire time-lapse information. For example, the imaging camera 107 acquires sample images at the predetermined time intervals. Thus, change over time in the amount of the particulate sample can be monitored.

In step S12, when the acquisition of the sample image is ended, a quantitative measurement operation is started for the acquired sample images. That is, as to be described below, the computer 108 functions as a particle quantitative measurement unit and quantitatively measures the particulate sample for each sample image.

Figure 13A:
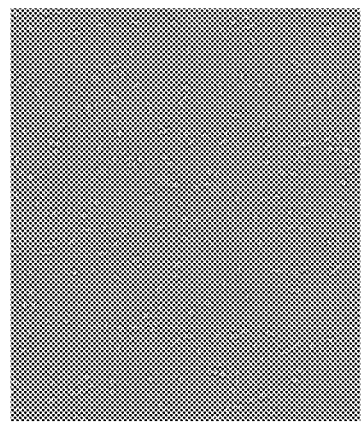
FIGS. 13A-13D show an example of an image in each step according to the third embodiment.

An example of processing in steps S14 to S18 in FIG. 12 will be described with reference to FIGS. 13A-13D. FIGS. 13A to 13D each represent an example of an image in each step according to the third embodiment. First, the computer 108 performs shading correction and the like on each sample image (step S14). In this way, as shown in FIG. 13A, sensitivity unevenness, light source unevenness, distortion and the like are corrected.

Next, the computer 108 selects a reference image (step S15). For example, the reference image is selected in the same manner as the first embodiment. In S15, a variation of the image in the reference image (for example, a variation of brightness values of pixels) is calculated. For example, as in the first embodiment, a standard deviation σ of the brightness of the pixels in the reference image is calculated.

Figure 13B:
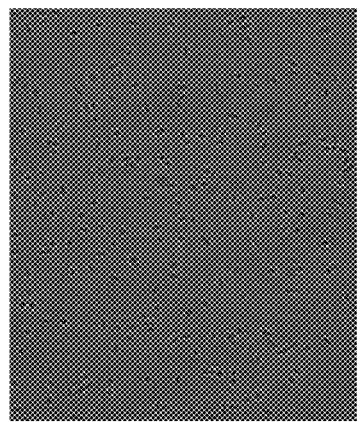

Next, the computer 108 subtracts the reference image from each sample image (step S16). For example, relative brightness Ir=I−M is calculated by subtracting the reference brightness M from the brightness I of each pixel. In this way, an image as shown in FIG. 13B is obtained.

Figure 13C:
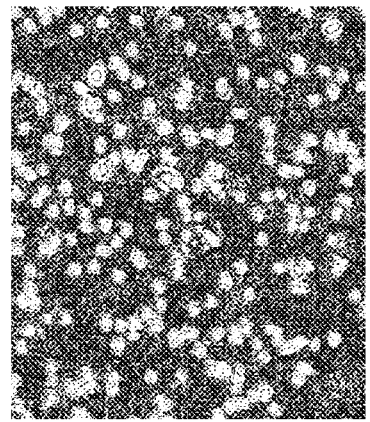

Next, the computer 108 extracts a low-brightness region based on the image obtained by the subtraction (step S17). For example, a pixel for which Ir<Th is satisfied for the relative brightness Ir is extracted as the low-brightness pixel. Here, for example, Th is defined as Th=−kσ. In this way, an image as shown in FIG. 13C is obtained. Here, although the low-brightness pixel is formally extracted based on the relative brightness Ir, the result is substantially the same as the result of extracting a pixel for which I<M−kσ is satisfied for the brightness I of each pixel.

In the third embodiment, a value of a threshold parameter k can be optionally selected, and may be set to, for example, k=1. As a specific method for extracting the low-brightness region, binarization processing may be performed. That is, the low-brightness pixel may be represented by bit 0, and other pixels (high-brightness pixels) may be represented by bit 1.

Figure 13D:
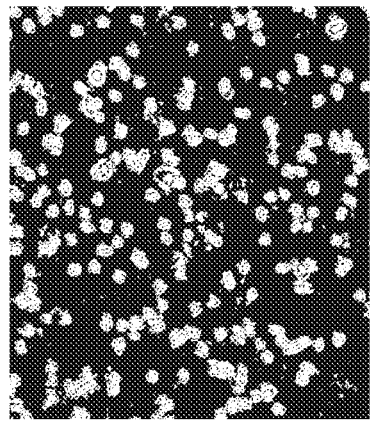

Next, the computer 108 performs processing related to the noise and outlier removal on the low-brightness region (step S18). The noise and outlier removal is to eliminate an influence of a pixel considered to be a noise or a pixel considered to be an outlier, a known method can be used, and a specific example will be described below. For example, in step S17, a pixel that is not a low-brightness pixel (that is, a high-brightness pixel) and is surrounded by the low-brightness pixels is determined to be a noise, and is extracted as a low-brightness pixel regardless of the result of step S17. In this way, an image as shown in FIG. 13D is obtained.

Here, a specific definition of the "pixel surrounded by low-brightness pixels" can be appropriately designed by a person skilled in the art, for example, a condition may be set that a total of four pixels on upper, lower, left, and right sides of the pixel are all low-brightness pixels, a condition may be set that a total of eight pixels including pixels in oblique directions are all low-brightness pixels, or other conditions may be used.

Next, the computer 108 recognizes or quantitatively measures the particulate sample based on the low-brightness region (step S19). The recognition or quantitative measurement can be performed in the same manner as step S4 of the first embodiment.

As described above, according to a particle recognition device, a particle quantitative measurement device, a particle recognition method, and a particle quantitative measurement method related to the observation device of the third embodiment, in addition to an effect of the first embodiment or the second embodiment, more accurate quantitative measurement can be performed by the noise removal.

Other Embodiments

The following modifications can be made on the first to third embodiments.

In the first to third embodiments, in addition to the low-brightness pixel, a high-brightness pixel may be extracted. For example, among the pixels of the sample image, a pixel for which I>M+kσ is satisfied may be extracted as the high-brightness pixel. In that case, the particulate sample can be recognized based on both the extracted low-brightness pixel and high-brightness pixel. For example, it can be determined that the particle is present in a region in which any one of the low-brightness pixel and the high-brightness pixel is present.

In the first to third embodiments, a method may be used in which a correction value based on the brightness of the pixel is determined in advance for each pixel, the each pixel is multiplied by the correction value and a low-brightness pixel is extracted based on the result. A method may also be applicable in which the average number of pixels per particle is acquired in advance, the number of the low-brightness pixels is divided by the average number, and the number of particles is calculated. These methods also have the same effects as that of each of the embodiments described above.

In the first to third embodiments, for a saturated low-brightness region, the amount of the particulate sample may be corrected based on an amount of decrease in the brightness. Even in an image or region in which the low-brightness pixels are saturated (that is, an image or region in which the low-brightness pixels no longer increases even if the amount of the particulate sample increases), as shown in FIGS. 8 and 9, if the amount of the particulate sample increases, the brightness decreases.

As a specific method of such a modification, a function for correcting the amount of particulate sample according to a statistical amount of the brightness of the pixels in a certain image or a specific region of the image may be used. The statistical amount of the brightness of the pixels may be, for example, a value of peak brightness in a brightness histogram as in FIGS. 5 to 9, or an average value of the brightness of the pixels. For example, it is possible to use a function for correcting the amount of particulate sample such that the amount of particulate sample increases as the peak brightness decreases. Since the decrease in brightness is information that more particles overlap with each other, the correction is performed based on the amount of decrease in brightness, thus the measurement range of the amount of particulate sample can be further widened, and a wider dynamic range can be obtained.

In the first to third embodiments, a format of the sample image can be optionally designed by a person skilled in the art. For example, an 8-bit grayscale image may be used, or a 16-bit grayscale image may be used. In addition, a color image may be used after the color image is converted into a grayscale image.

In the first to third embodiments, a transmission light image is used as the sample image, but the sample image is not limited to the transmission image. For example, a phase difference image, a differential interference image, or the like that can be acquired by a known means can also be used as the sample image. In this case, the processing is the same.

In the first to third embodiments, the particulate sample has translucency, but a particulate sample that does not have translucency may be used. In addition, as the particulate sample, for example, particles, cells, or bacteria are used, and other samples may also be used.

In the first to third embodiments, image correction may be performed on the sample image. For example, image processing such as the shading correction, the sensitivity unevenness correction, the noise removal, and smoothing may be performed. In addition, the light source unevenness, detector sensitivity unevenness, and the like may be corrected. When these corrections are performed, it is possible to perform a more accurate quantitative measurement.

In the first to third embodiments, the optical system of the observation device does not need to have a configuration as in FIG. 1, and may have any configuration as long as the image acquisition unit that acquires the sample image can be provided. In addition, the sample image may be acquired via a communication network, a portable storage medium, or the like without including the optical system.

In the first to third embodiments, the observation device may not quantitatively measure the particulate sample. For example, the observation device may be a device that identifies the particle present region and outputs a position, a shape, or the like of the region.

The present disclosure is not limited to the embodiments and modifications described above, and also includes various other modifications. Each embodiment has been described in detail for easy understanding of the present disclosure, and the invention is not necessarily limited to those including all the configurations described above. In addition, a part of the configuration of a certain embodiment can be replaced with a part of the configuration of another embodiment, and a part of the configuration of the another embodiment can be added to the configuration of the certain embodiment. In addition, a part of the configuration of each embodiment may be added to, deleted from, or replaced with the configuration of another embodiment.

REFERENCE SIGN LIST

1: observation device (particle quantitative measurement device)
101: illumination optical system
102: sample container
103: pedestal
104: XY stage
105: objective lens
106: objective lens actuator
107: imaging camera (image acquisition unit)
108: computer (data processing unit, particle recognition unit, particle quantitative measurement unit)
M: reference brightness
k: threshold parameter
σ: standard deviation
S2: step (acquisition step)
S4: step (recognition step, quantitative measurement step)

All publications, patents, and patent applications cited in the description are incorporated in the description by reference as it is.

The invention claimed is:

1. A particle quantitative measurement device, comprising:
an image acquisition unit configured to acquire a sample image representing a particulate sample; and
a data processing unit configured to perform arithmetic processing on the sample image, wherein
the data processing unit is further configured
to extract a low-brightness pixel, for which I<M−kσ is satisfied for brightness I, from pixels of the acquired sample image, wherein M represents brightness for a reference image, k represents a real positive number, and σ is a calculated standard deviation for the brightness of pixels in the reference image,
to set a region as a particulate present region based on the extracted low-brightness pixel, and
to identify and recognize the particulate sample based on the particulate present region formed using the extracted pixel such that an accuracy in a count of a number of particles present in the sample image remains accurate regardless of the number of particles actually present in the sample.

2. The particle quantitative measurement device according to claim 1, wherein
the data processing unit is further configured to quantitatively measure the particulate sample.

3. The particle quantitative measurement device according to claim 2,
wherein the data processing unit is further configured
to extract an individual identification region from the sample image by individually identifying particles based on the sample image; and
to quantitatively measure the particulate sample based on a logical sum region obtained by a logical sum of a low-brightness region formed of the low-brightness pixels and the individual identification region.

4. The particle quantitative measurement device according to claim 3, wherein
the data processing unit is further configured to quantitatively measure the particulate sample based on an average value of the brightness of pixels in the logical sum region, an integration value of the brightness of the pixels in the logical sum region, or a total number of the pixels in the logical sum region.

5. The particle quantitative measurement device according to claim 3, wherein
the data processing unit is further configured to quantitatively measure the particulate sample based on a ratio of the number of pixels in the logical sum region to the total number of the pixels of the sample image.

6. The particle quantitative measurement device according to claim 2, wherein
the data processing unit is further configured to quantitatively measure the particulate sample based on a ratio of the number of the low-brightness pixels to the total number of the pixels of the sample image.

7. The particle quantitative measurement device according to claim 2,
wherein the data processing unit is further configured
to acquire a calibration curve that associates a value related to the low-brightness pixel with an amount of the particulate sample; and
to quantitatively measure the particulate sample based on the calibration curve and the value related to the low-brightness pixel in the sample image.

8. The particle quantitative measurement device according to claim 2,
wherein the data processing unit is further configured
to acquire the sample image at predetermined time intervals; and
to quantitatively measure the particulate sample for each sample image.

9. The particle quantitative measurement device according to claim 1, wherein
the particulate sample has translucency, and
the particulate sample is particles, cells, or bacteria.

10. The particle quantitative measurement device according to claim 1, wherein
the reference image is a sample image in which the number of particles is 0 or a sample image in which the number of particles is regarded as 0.

* * * * *